United States Patent [19]

Smith

[11] 3,865,759
[45] Feb. 11, 1975

[54] ROOM TEMPERATURE VULCANIZING SILICONE COMPOSITIONS

[75] Inventor: Robert A. Smith, Schenectady, N.Y.

[73] Assignee: General Electric Company, Waterford, N.Y.

[22] Filed: Jan. 10, 1974

[21] Appl. No.: 432,409

[52] U.S. Cl......... 260/2.5 B, 252/431 C, 260/2.5 S, 260/18 S, 260/42.26, 260/46.5 G, 260/448.2 B, 260/824, 260/825, 260/826, 260/827
[51] Int. Cl............................................. C08g 53/10
[58] Field of Search .... 252/431 C; 260/46.56, 18 S, 260/2.5 S, 448.2 B, 2.5 B

[56] References Cited
UNITED STATES PATENTS

| | | | |
|---|---|---|---|
| 3,019,204 | 1/1962 | Preston | 252/431 C |
| 3,070,555 | 12/1962 | Bruner, Jr. | 260/2.5 S |
| 3,579,467 | 5/1971 | Brown, Jr. | 260/448.2 B |

*Primary Examiner*—Morton Foelak
*Attorney, Agent, or Firm*—Donald J. Voss; George B. Finnegan, Jr.; Edward A. Hedman

[57] ABSTRACT

Stable catalyst compositions providing faster cure time in room temperature vulcanizing organopolysiloxane compositions containing them comprise stannous salts of branched chain alkyl carboxylic acids having from 8 to 12 carbon atoms and, as a stabilizing carrier therefor, a methyl alkyl polysiloxane fluid having hydroxy aryl substituents. The catalyst compositions are uniquely adapted to provide injectable compositions curable to low density, high compressive strength syntactic foams, useful, e.g., for custom fitting footwear to the wearer.

13 Claims, No Drawings

ROOM TEMPERATURE VULCANIZING SILICONE COMPOSITIONS

This invention relates to stabilized active catalyst composition for increasing the cure rate of room temperature vulcanizing organopolysiloxane compositions, and to compositions catalyzed with such compositions. More particularly, the invention relates to catalyst compositions comprising stannous salts of branched chain alkyl carboxylic acids having from 8 to 12 carbon atoms, and as a carrier therefor, a fluid methyl alkyl polysiloxane having hydroxy aryl substituents, and to room temperature vulcanizing compositions catalyzed therewith, the latter comprising silanol-terminated polyorganosiloxanes and cross-linking polyfunctional organosilicon compounds. The catalyzed compositions may also include lightweight hollow microspheres, in which case they cure to syntactic foams.

BACKGROUND OF THE INVENTION

It is a well known characteristic of stannous octoate, when used as a catalyst in room temperature vulcanizing silicone compositions, to find that it loses all of its catalytic activity upon repeated opening and closing of the containers in which it is stored, alone or as commonly diluted for use in a silicone fluid, e.g., a trimethylsilyl-stopped dimethyl polysiloxane. The loss in activity is apparently due primarily to oxidation of stannous tin to the inactive stannic tin by air or by air and moisture during exposure. Somewhat better results are obtained if stannous octoate is replaced by stannous salts of branch chain carboxylic acids having from 8 to 12 carbon atoms. Best results in this series are obtained if the acids are fully branched. Stannous neodecanoate, which has 10 fully branched carbon atoms, is especially improved in stability in comparison to stannous octoate. However, when these more stable stannous salts are diluted in a dimethyl polysiloxane fluid to facilitate storage, measurement and compounding these are found to deteriorate quickly on air exposure.

It has now been discovered that if the stannous salts of branched chain alkyl carboxylic acids having from 8 to 12 carbon atoms are combined with a very specific type of organo-polysiloxane carrier fluid, there will be obtained a very superior catalyst composition. In particular, a stable, active catalyst composition is obtained using as carrier fluid, a methyl alkyl polysiloxane having hydroxy aryl substituents. These fluids appear to solubilize the stannous salts of branched carboxylic acids very readily and, at the same time, provide in solubilized form a hindered phenolic type substituent which effectively retards the oxidation of stannous tin to inactive stannic tin. Somwhat surprisingly, this same fluid does not readily solubilize the conventional tin soap catalyst, stannous octoate, and many attempts to provide catalysts system based on this fluid and stannous octoate have failed because such compositions deteriorate rapidly upon air exposure.

Such novel catalyst compositions are superior to conventional stannous soap compositions in all room temperature vulcanizing rubber formulations, but they are vastly superior to stannous octoate compositions in the production of articles having silicon compositions injected and then cured in place, in contact with human body parts. Such articles comprise footwear, such as shoes, boots and the like, custom-fitted to the foot of the wearer, and they are disclosed and claimed in the copending application of Robert L. Blomquist, Alfred H. Smith, Jr., Robert A. Smith and Richard P. Surprenant, entitled, FOOTWEAR INCLUDING CORE OF CUSTOM FITTING COMPOSITION, filed in the United States Patent Office on Dec. 5, 1973 under Ser. No. 421,968 assigned to the assignee of the present invention and the disclosure of which is incorporated herein by reference. The present invention has, as one of its principal features, the provision of a curable, injectable syntactic foam composition for custom fitting footwear, catalyzed with the new stabilized composition.

DESCRIPTION OF THE INVENTION

According to this invention, there are provided stabilized catalyst compositions comprising:
  i. a stannous carboxylate of a branched chain alkyl carboxylic acid having from about 8 to about 12 carbon atoms in the alkyl chain; and, as a stabilizing carrier therefor,
  ii. a fluid organopolysiloxane composition having an average formula:

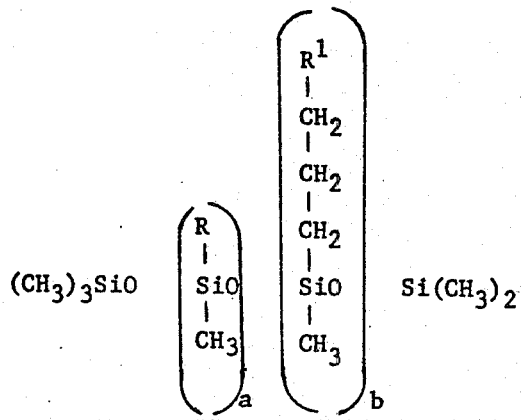

where R is a higher alkyl radical, $R^1$ is selected from the class consisting of monovalent and divalent hindered t-butyl-substituent radicals, the sum of $a$ plus $b$ is from 5 to 40, inclusive, and the ratio of $b$ over the sum of $a$ plus $b$ is from 0.005 to 0.1, inclusive.

Component (i) of the catalyst composition is a stannous salt of a branched alkyl carboxylic acid from 8 to 12 carbon atoms. The higher the degree of branching within the chain, the better. Fully branched chains are best, e.g., the so-called neocarboxylates. If less than 8 carbon atoms are present or if greater than 12 carbon atoms are present, the solubility compatibility with the stabilizing carrier fluid becomes a factor and the compositions do not function as effectively, and they are not as stable. Most preferably, the alkyl carboxylic acid in the stannous carboxylate will contain 10 carbon atoms and the fully branched carboxylate of 10 carbon atoms per carboxylate group, known as stannous neodecanoate is the most preferred. All such stannous carboxylates can be made by those skilled in the art, e.g., by reacting a stannous halide or alkoxide with the corresponding branched alkyl carboxylic acid or reactive derivative thereof, alone, or in an inert solvent. Several such carboxylates are also commercially available. Illustrative of specific branch chained carboxylates are isooctanoates, isodecanoates, neodecanoates, 2',2' dimethyldecanoates, and the like. Stannouos neodecanoate is commercially available from Mooney Chemicals, Inc., Cleveland, Ohio 44113. It is a bland liquid which is insoluble in water and has a specific gravity of 1.23.

Component (ii) of the catalyst composition, the fluid organopolysiloxane having hydroxyl aryl substituents can be made following the procedures described in detail in Brown, Jr., U.S. Pat. No. 3,579,467, assigned to the assignee of the present application, and incorporated herein by reference.

As described in the Brown patent, the preparation of the polysiloxanes defined as component (i) involves an SiH-olefin addition reaction. This reaction involves the addition of an alpha-olefin having a higher alkyl content, from 4 to 30 carbon atoms, more particularly, from 6 to 12 carbon atoms, and an allylated t-butyl phenol to a conventional methyl hydrogen polysiloxane. For example, butene-1, hexene-1, octene-1, decene-1, dodecene-1, hexadecene-1, and the like, can be used. More specifically, the preparation of a methyl higher alkyl polysiloxane having a hydroxyl aryl substituent involves the reaction between a methyl hydrogen polysiloxane having the formula:

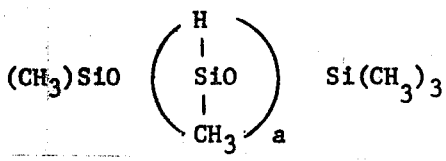

wherein $a$ is from 5 to 40, an alpha olefin and an allylated t-butyl phenol.

The reaction of the alpha olefin and the methyl hydrogen polysiloxane can take place in the presence of a known elemental platinum or platinum compound catalyst.

Among the many useful catalysts for this addition reaction are chloroplatinic acid as described in Speier, et al., U.S. Pat. No. 2,823,218, the reaction product of chloroplatinic acid with either an alcohol, an ether or an aldehyde as described in Lamoreaux, U.S. Pat. No. 3,200,972, trimethyl platinum iodide and hexamethyl diplatinum as described in Lamoreaux, U.S. Pat. No. 3,313,773, the platinum olefin complex catalysts described in Ashby, U.S. Pat. No. 3,159,601, the platinum cyclopropane complex catalyst described in Ashby, U.S. Pat. No. 3,159,662, and the like.

The SiH-olefin addition reaction to produce component (ii) may be conducted at room temperature or at temperature up to 200°C., depending upon the catalyst concentration, which can vary from $10^{-7}$ to $10^{-3}$ and preferably, $10^{-5}$ to $10^{-4}$ moles of platinum as metal per mole of olefin containing molecules present. Generally, the methyl hydrogen polysiloxane is reacted first with an allylated aromatic hydroxy compound in an amount less than that necessary to cover all of the Si—H bonds. The catalyst is added in aliquot portions as the reaction proceeds. Then the alpha olefin is added at a rate sufficient to maintain the reaction temperature within the range of from about 50° to 120°C. and, at the end of the addition of the alpha olefin, the reaction is completed. The product is recovered by any convenient method, as is described in the above-mentioned Brown, Jr. patent.

For example, when it is desired to produce a methyl alkyl polysiloxane having hydroxyl aryl substituents corresponding to component (ii), the starting material can be a trimethylsilyl chain-stopped methyl hydrogen polysiloxane containing an average of 38 methyl hydrogen siloxane units per molecule. One mole of this methyl hydrogen polysiloxane is reacted with 1 mole of an allylated t-butyl-substituted phenol, such as

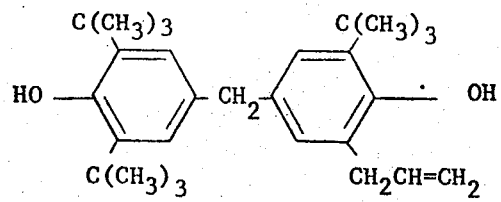

to produce a trimethylsilyl chain-stopped copolymer in which the average molecule contains 37 methyl hydrogen siloxane units and 1 unit in which the $R^1$ is the radical shown in the formula:

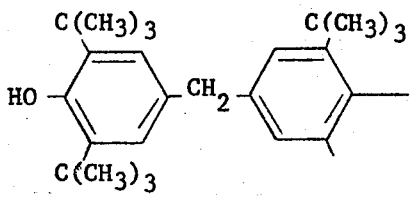

Then one mole of the resulting copolymer is reacted with 37 moles of an appropriate alpha olefin, such as decene-1, according to the method previously described, to produce component (ii) wherein R is, e.g., decyl and $R^1$ is the radical shown above and $a$ is 37 and $b$ is 1 and the ratio of $b/a+b$ is 0.026.

Component (i) and (ii) can be mixed in any desirable or convenient manner to produce the stabilized catalyst compositions; the order of addition is not critical. It is preferred to use an amount of component (i) which gives a high enough concentration of the stannous branched carboxylate in the composition to minimize the volume of material required for storage and shipment, but the amount should not exceed the solubility of the stannous carboxylate in the silicon fluid carrier. In general, the amount of compound (i) can vary between about 5 and 30% by weight and preferably, between 15 and 25% by weight, based on the combined weights of (i) and (ii).

The catalyst compositions can be used in any room temperature vulcanizing composition wherein stannous octoate has heretofore been employed as a catalyst, making suitable adjustments for the stannous tin content in the final formulation. The catalyzed compositions are an embodiment of this invention. They have especially fast cure times.

According to the present invention, there are provided catalyzed room temperature vulcanizable silicone rubber compositions comprising:

A. a linear diorganopolysiloxane having terminal silicon-bonded hydroxyl groups;

B. a polyfunctional organo silicon compound containing more than two functional groups and capable of cross-linking (A); and C. a tin soap condensation catalyst, the catalyst component (C) being the improved catalyst composition of this invention, as hereinabove defined. Such compositions have excellent shelf life and cure very rapidly at ordinary temperatures.

Room temperature vulcanizable silicone rubber compositions including (A), (B) and (C) are well known to those skilled in this art, and are described, for example, in Nitzsche, et al., U.S. Pat. No. 3,127,363, and in Shaw, U.S. Pat. No. 3,701,753, the disclosures of which are incorporated herein by reference.

The improved compositions of this invention are made by substituting as component (C), the catalyst composition hereinabove described. Illustratively, component (A) will be a substantially difunctional, linear, extensively precondensed but not resin-like organosiloxane of the general formula:

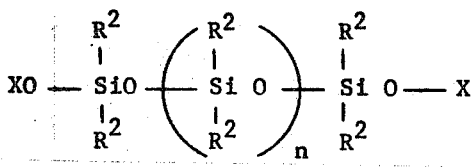

in which $R^2$ represents an alkyl or aryl radical, such as a methyl, ethyl or phenyl radical, or a halogen- or cyano-substituted such radical; X represents hydrogen or radical $R^2$ and $n$ is a whole number of at least 10.

Conventionally, the cross-linking component (B) will be a polyfunctional organo-silicon compound containing more than two functional groups. They will be either organo-silicon compounds of the general formula:

$$R_m{}^7 Si X_{4-m}$$

in which $R^7$ is an alkyl or aryl radical, X is a reactive group capable of condensation with a silanol group of component (A), such as a hydroxyl; alkoxy, aryloxy or acyloxy group, and $m$ is a number from 0 to less than 2; or they will be the corresponding siloxanes. This definition covers the following groups of compounds:
  a. silanes of the formula $R_mSiX_{4-m}$;
  b. corresponding di-, tri-, tetra- or polysiloxanes;
  c. organopolysiloxane resins having a functionality greater than 2, and advantageously greater than 2.5;
  d. organo hydrogen polysiloxanes of the formula:

$$R_mHSiO_{3-m/2}$$

in which $m$ is a number less than 2, but is not zero. Preferably, they will be trialkoxyalkylsilanes or triacyloxyalkylsilanes.

In the Nitzsche et al. patent, catalyst components (C) are illustratively metal soaps, for example, tin ricinoleate or cobalt naphthenate. In the patent, the disadvantages of the prior art metal salts of simple carboxylic acids are pointed out, it being said that they act too slowly, are not satisfactory physiologically, or discolor the mass. In any event, the amount of the present catalyst component (C) will preferably be 0.1 to 5% by weight of tin based on component (A). Moreover, as is conventional, it is possible to include any filler or additive customarily used in the manufacture of silicone rubber, and known methodos for curing and using such compositions, for example, as in conventional sealing, impregnating or casting compositions, as paints or coating compositions, and in the manufacture of molded articles. These are fully set forth in the Nitzsche et al. patent, which has been incorporated herein by reference to save unnecessarily detailed description.

The present invention in another of its especially preferred aspects provides syntactic foam compositions. "Syntactic" in this sense means that the foam has not been prepared by internally generating voids thereon, such as by blowing gas into the composition or using blowing agents, but rather by adding lightweight filler material, such as cork, and the like, but preferably, hollow microspheres or beads of the type well known to those skilled in the art.

According to the present invention, low density, high compressive strength syntactic foam compositions will comprise:
  1. a low density filler comprising hollow microspheres;
  2. a linear, fluid, organopolysiloxane containing only terminal, silicon-bonded hydroxy groups, convertible to a cured, solid state, alone, or in admixture with a linear, fluid organopolysiloxane having a 1 to 1 ratio of terminal silicon-bonded triorganosiloxy to terminal siliconbonded hydroxy groups, convertible to a cured, solid state;
  3. an alkyl silicate selected from the class consisting of
    a. a monomeric organosilicate corresponding to the general formula:

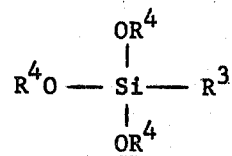

wherein $R^4$ is alkyl, haloalkyl, aryl, haloaryl, alkenyl, cycloalklenyl, cyanoalkyl, and $R^3$ is the same as $R^4$ or alkoxy or aryloxy, or
    b. a liquid partial hydrolysis product of the aforementioned organosilicate monomeric compounds; and
  4. a catalyst composition comprising:
    i. a stannous carboxylate of a branched chain alkyl carboxylic acid having from about 8 to about 12 carbon atoms in the alkyl chain; and as a stabilizing carrier therefor; and
    ii. a fluid organopolysiloxane composition having an average formula:

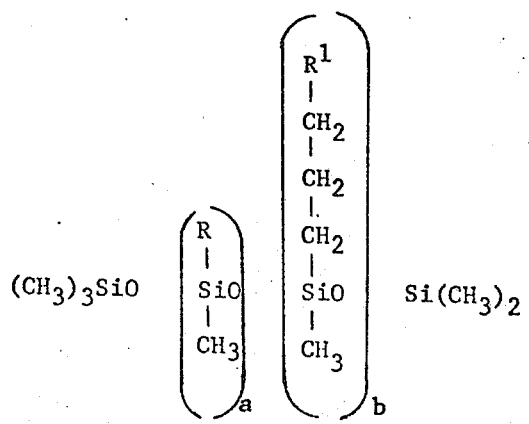

wherein R is a higher alkyl radical, $R^1$ is selected from the class consisting of monovalent and divalent hindered t-butyl-substituted hydroxy aryl radicals, the sum of 9 plus $b$ is from 5 to 40, inclusive, and the ratio of $b$ over the sum of $a$ plus $b$ is from 0.005 to 0.1, inclusive.

The amount of lightweight filler employed will be selected to provide the final density desired. In general, enough will be used to insure that the final composition has a density of below 0.9 g./cm$^3$. Hollow microspheres of glass, carbon, phenolic, epoxy, silica, vinylidene chloride/acrylonitrile, urea-formaldehyde resins, and the like, are articles of commerce. They are typically spheroidal in shape and appear as free flowing powders. The particle range in diameter from 1 to a few hundred microns, with a wall thickness usually in the order of 1 to 4 microns. The most preferred such microspheres will be bubbles varying in size from 0.0002 inch to 0.005 inch and which have an average diameter of 0.0017 inch. The preferred microspheres are made of glass, phenolic or urea-formaldehyde.

Optionally, the syntactic foams can include a reinforcing or semi-reinforcing filler, so long as the amount does not cause the density of the foam to go above 0.9 g./cm.$^3$. If such a filler is used, it will preferably be calcium carbonate or a fumed colloidal silica or a precipitated silica, said silica filler having been treated with an organosilicon trimer, tetramer, or disilazane to render it hydrophobic.

In the syntactic foam composition, it is preferred to use an admixture of polysiloxanes of the formulae:

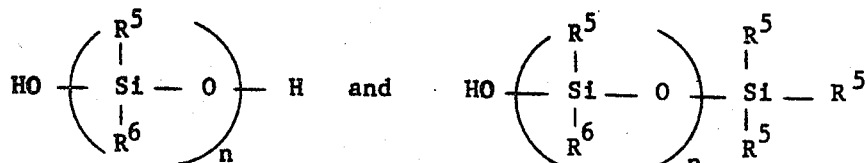

wherein $R^5$ and $R^6$ are alkyl, aryl, haloalkyl, haloaryl, alkaryl, aralkyl, alkenyl, haloalkenyl, cyanoalkyl, cycloalkyl or cycloalkenyl, and n is a number sufficiently high to provide a fluid viscosity of at least about 400 centipoises. The amount of the components in the admixture can vary between 5 and 95 parts of one to 95 to 5 parts of the other. Especially preferably, the organopolysiloxane will be one wherein $R^5$ and $R^6$ are methyl.

The organosilicate cross-linker is, preferably one of the formula:

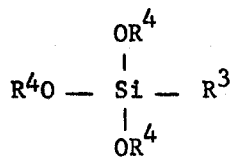

wherein $R^3$ is ethoxy, phenyl, n-propoxy or vinyl and $R^4$ is ethyl, or n-propyl.

The catalytic agent for curing will be the stannous carboxylates in a methyl alkyl organopolysiloxane containing hydroxy aryl substituents as described above and, preferably, it will be stannous neodecanoate. In some cases, the syntactic foam composition also will include a thioxtropic agent comprising a hydrogenated oil, e.g., hydrogenated castor oil.

A preferred family of syntactic foam compositions will comprise:

1. a low density filler comprising glass hollow microspheres, phenolic or urea-formaldehyde hollow microspheres in an amount sufficient to provide an ultimate composition density of below 0.9 g./cm.$^3$ and from 0 to 20% by weight of calcium carbonate or fumed or precipitated silica, said silica having been treated to render it hydrophobic;
2. a polydimethylsiloxane having silicon-bonded terminal hydroxyl groups and a viscosity of 600 to 6,000 cps. blended with a partially trimethylsilyloxy, partially —OH terminated polydimethylsiloxane of 400 to 900 cps.;
3. from about 0.2 to about 5% by weight of ethyl ortho silicate or a mixture of diphenyl dimethoxysilane and triethoxy vinyl silane; and
4. from about 0.5 to about 2% by weight of stannous neodecanoate based on (2), in admixture with from a major proportion, based on the stannous carboxylate, of a methyl decyl polyorganosiloxane containing a hydroxy aryl substituent.

DESCRIPTION OF THE PREFERRED EMBODIMENTS

The following examples illustrate the compositions and articles prepared according to this invention. They are illustrative, and are not to be construed to limit the scope of the invention in any manner whatsoever.

EXAMPLE 1

A catalyst composition according to this invention is prepared comprising 20 parts by weight of stannous neodecanoate (Stannous Ten-Cem, Mooney Chemical Co., Cleveland, Ohio) and 80 parts by weight of a liquid trimethylsilyl chain-stopped methyl decyl polysiloxane having a t-butyl hydroxy aryl propyl-substituted silicon atom content, prepared according to Example 6 of U.S. Pat. No. 3,579,467.

A room temperature vulcanizing silicone-base composition is prepared under anhydrous conditions comprising:

|  | parts by weight |
|---|---|
| a fluid, silanol end-stopped polydimethylsiloxane having a viscosity of 3,000 ± 500 centipoises (cps.) at 30°C. | 100 |
| a precipitated calcium carbonate (filler) | 40 |
| a partially condensed ethyl orthosilicate (Union Carbide, ES-40) | 3 |

A catalyzed, room temperature vulcanizable composition according to this invention is prepared by adding 10% by weight of the catalyst composition in the base composition.

The catalyzed composition cures to a rubber within 140 seconds.

To demonstrate the stability of the catalyst composition, it is stored in a vial open to the air at 77°F. and 50% relative humidity then used to catalyze the base compositions. The cure times after storage intervals are as follows:

| Open vial storage (days) | Cure time (seconds) |
| --- | --- |
| 7 | 175 |
| 16 | 255 |
| 31 | 435 |

Not only is initial cure very fast, but after storage in the open, fast cure rates still are obtained after 31 days, indicating excellent storage stability.

The catalyst composition is also subjected to accelerated aging in a sealed vial at 50°C. and then used to catalyze the base composition. The cure times after storage intervals are as follows:

| Sealed vial storage, 50°C. (days) | Cure time (seconds) |
| --- | --- |
| 2 | 155 |
| 16 | 260 |
| 31 | 450 |

Thus, the catalyst retains a substantial amount of its activity even when heated during storage.

The catalyzed composition is also subjected to stability testing by storing in sealed containers at 25°C., then opening and measuring the cure times after intervals. The results are as follows:

| Sealed vial storage, 25°C. (days) | Cure time (seconds) |
| --- | --- |
| 0 (initial) | 165 |
| 13 | 185 |
| 23 | 200 |
| 37 | 180 |

For all practical purposes, the composition retains its pot life or working time throughout the interval. It is seen that an efficient, stable composition with rapid cure rate is provided.

EXAMPLE 2

An injectable syntactic foam composition is prepared using the stabilized catalyst composition described in Example 1. The base formulation is 29.91 parts by weight of a silanol stopped dimethylpolysiloxane of 8,000 ± 2,000 cps. viscosity weight; 11.90 parts by weight of a calcium carbonate filler; 47.52 parts by weight of a trimethylsilyl/hydroxy terminated dimethylpolysiloxane fluid, 0.40 parts by weight of hydrogenated castor oil as a thixotrope; 7.80 parts of a low density filler comprising glass microballoons (GMBS-B-22A, 3M Co., Minneapolis, Minn.); and 1.86 parts of a partially hydrolyzed ethyl orthosilicate cross-linking agent (Union Carbide Corp., ES-40) and 0.6 parts of water. To 150 parts of the base 1.7% by weight of stannous neodecanoate is added (to provide 2.2% based on the polysiloxane fluids) by using an appropriately weighed quantity of the catalyst composition. The compound properties are white; the uncatalyzed viscosity is 15,000 cps. After catalyzing, the work life in minutes is 5.7; and the tack-free time is 9 minutes. The measurement of catalyzed viscosity vs. time at one minute intervals is as follows:

| Time (minutes) | Viscosity (cps.) |
| --- | --- |
| 2 | 31,000 |
| 3 | 52,000 |
| 4 | 97,000 |
| 5 | 220,000 |

Physical properties on the cured composition are measured according to ASTM methods after curing at 77°F. and 50% relative humidity for 24 hours. The results are as follows:

| | |
| --- | --- |
| Shore A durometer | 29 |
| Tensile strength, psi | 70 |
| Elongation, % | 90 |
| Tear strength, pounds/inch | 20 |
| Specific gravity g./cc. | 0.80 |

Ski boots are custom-fitted by injecting the catalyzed composition into the free space between the foot of the wearer and the inside of the boot and allowed to cure, as described in the above-identified copending Blomquist, Smith, Smith, Jr., and Surprenant application. The boots are test skied and the foam is found to retain its shape and to provide good edge control.

It is obvious that the specific examples describe the preparation of a stabilized catalyst composition with improved storage stability and the ability to catalyze the curing silicone compositions very efficiently. The examples describe the preparation of catalyzed silicone compositions with excellent storage stability when sealed. The examples also describe the preparation of a catalyzed foam composition uniquely adapted to custom fitting footwear to the wearer. Obviously, many variations will suggest themselves to those skilled in the art in the light of the present detailed disclosure. The appended claims are intended to define the invention as specifically disclosed as well as all obvious variations thereof.

I claim:

1. An injectable catalyzed composition curable to a low density, high compressive strength foam, said composition comprising:
   1. a low density filler comprising hollow microspheres;
   2. a linear fluid organopolysiloxane containing terminal silicon-bonded hydroxy groups, convertible to a cured solid state, alone, or in admixture with a linear, fluid organopolysiloxane having a 1:1 ratio of terminal silicon-bonded triorganosilyloxy to terminal silicon-bonded hydroxy groups, convertible to a cured solid state;
   3. an alkyl silicate selected from (a) a monomeric organosilicate corresponding to the general formula:

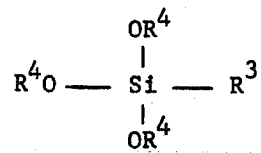

wherein $R^4$ is alkyl, haloalkyl, aryl, haloaryl, alkenyl, cycloalkyl or cyanoalkyl, and $R^3$ is the same as $R^4$ or alkoxy or aryloxy or (b) a liquid partial hydrolysis product of the aforementioned organosilicate monomeric compounds; and 4. a catalyst composition comprising:
   i. a stannous carboxylate of a branched chain alkyl carboxylic acid having from about 8 to about 12 carbon atoms in the alkyl chain; and as a stabilizing carrier therefor,
   ii. a fluid organopolysiloxane composition having an average formula:

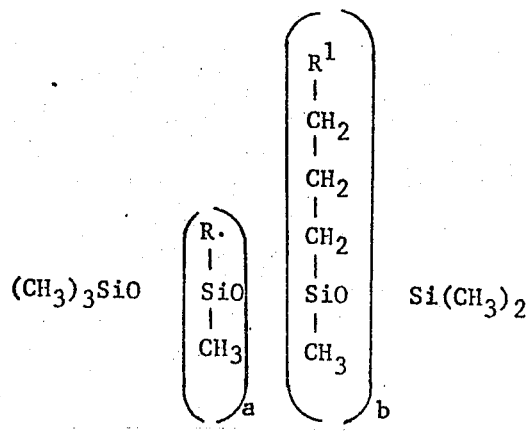

where R is a higher alkyl radical, $R^1$ is selected from the class consisting of monovalent and divalent hindered t-butyl-substituted hydroxyaryl radicals, the sum of $a$ plus $b$ is from 5 to 40, inclusive, and the ratio of $b$ over the sum of $a$ plus $b$ is from 0.005 to 0.1, inclusive.

2. A composition as defined in claim 1 wherein component (i) is a fully branched chain alkyl carboxylate salt and constitutes from about 5 to about 30% by weight of (i) and (ii).

3. A composition as defined in claim 2 wherein component (i) constitutes from about 15 to about 25% by weight of (i) and (ii).

4. A composition as defined in claim 1 wherein component (i) is stannous neodecanoate.

5. A composition as defined in claim 1 wherein said low density filler comprises hollow microspheres of glass, carbon, silica, vinylidene chloride/acrylonitrile copolymer or urea-formaldehyde resin.

6. A composition as defined in claim 5 wherein said light weight filler comprises hollow microspheres of glass.

7. A composition as defined in claim 1 which also includes a reinforcing or semi-reinforcing filler.

8. A composition as defined in claim 7 wherein said reinforcing or semi-reinforcing filler is calcium carbonate, a fumed colloidal silica or a precipitated silica, said silica filler having been treated with an organosilicon trimer or tetramer to render it hydrophobic.

9. A composition as defined in claim 1 wherein said organopolysiloxane component (2) is a blend of compounds of the formula:

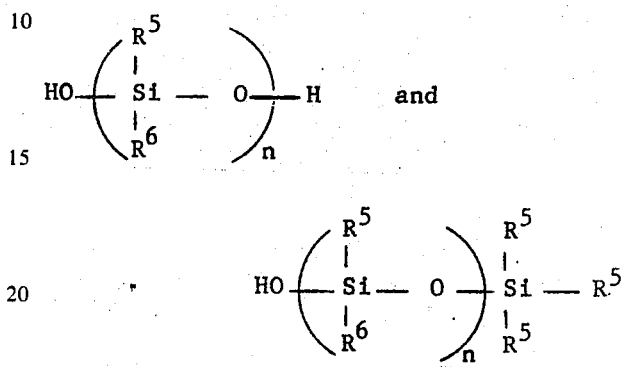

wherein $R^5$ and $R^6$ are alkyl, aryl, haloalkyl, haloaryl, alkaryl, aralkyl, alkenyl, haloalkenyl, cyanoalkyl, cycloalkyl or cycloalkenyl, and $n$ is a number sufficiently high to provide a fluid viscosity of at least about 400 centipoises.

10. A composition as defined in claim 9 wherein $R^5$ and $R^6$ are methyl.

11. A composition as defined in claim 1 wherein said organosilicate is of the formula:

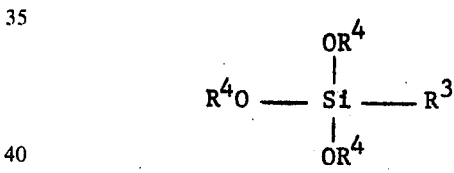

wherein $R^3$ is ethoxy, phenyl, n-propoxy or vinyl and $R^4$ is ethyl or n-propyl.

12. A composition as defined in claim 1 in which the syntactic foam composition also includes a thixotropic agent.

13. A composition as defined in claim 12 wherein said thixotropic agent is hydrogenated castor oil.

* * * * *